March 10, 1931.  H. J. STECKROTH  1,795,520
SIGNAL
Filed April 26, 1929  2 Sheets-Sheet 1
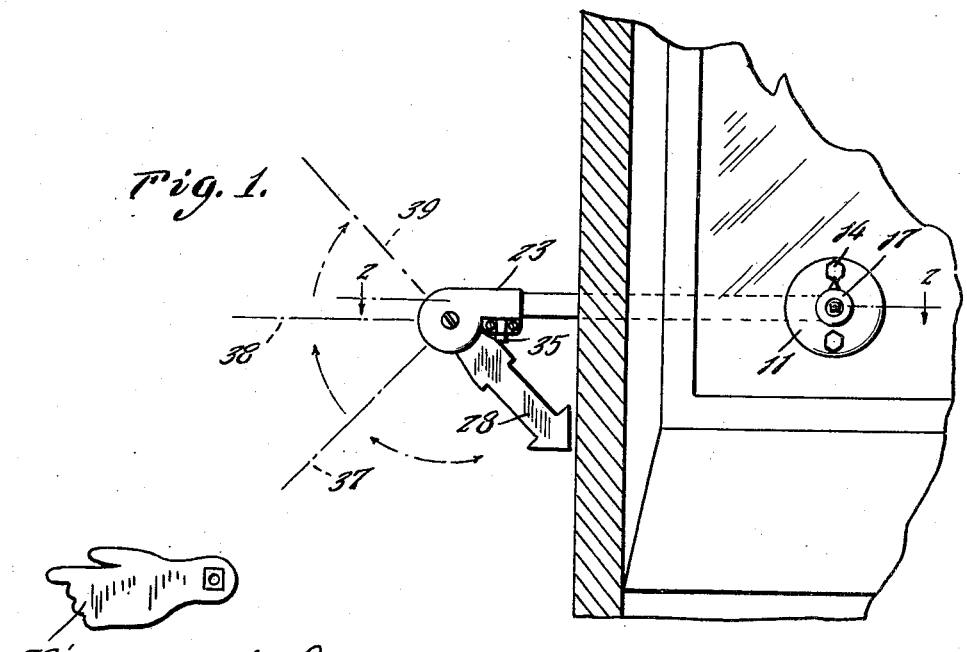
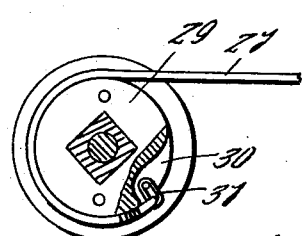
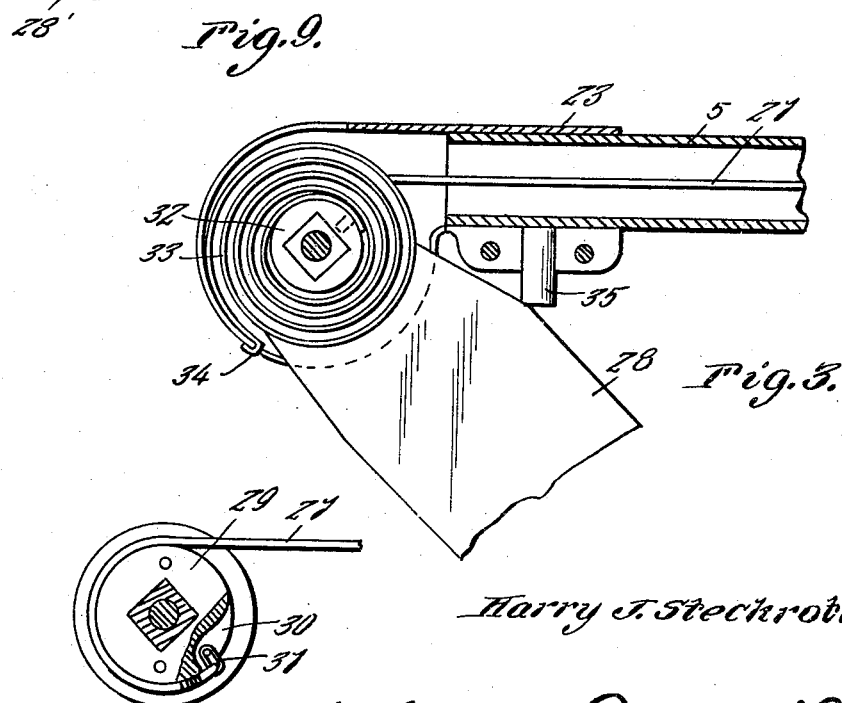
Inventor
*Harry J. Steckroth*
By *Clarence A. O'Brien*
Attorney

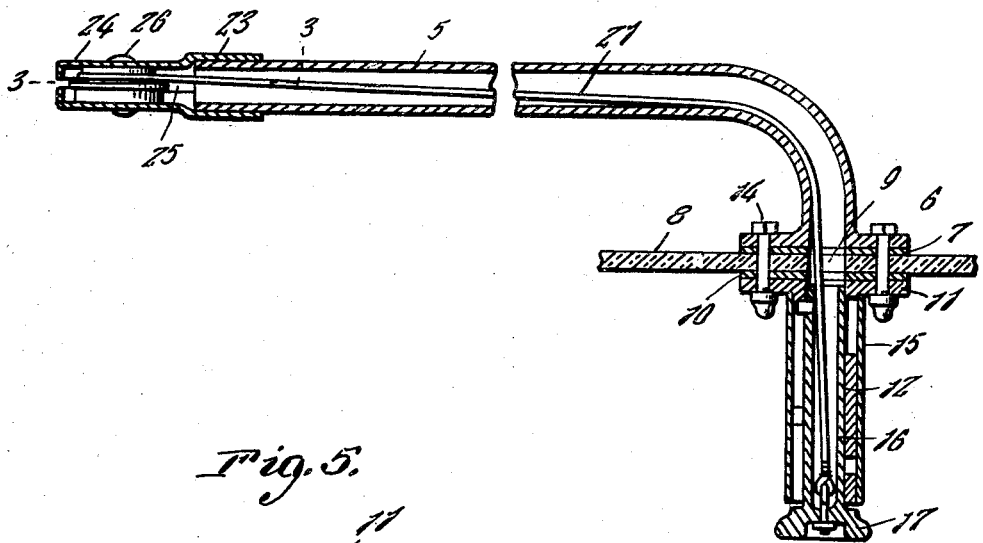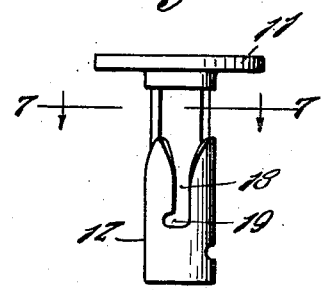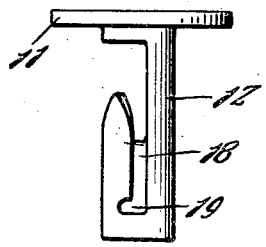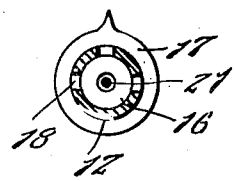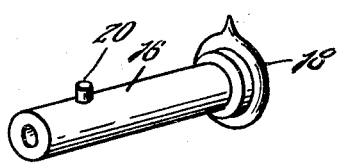

Patented Mar. 10, 1931

1,795,520

UNITED STATES PATENT OFFICE

HARRY J. STECKROTH, OF WEST HAZLETON, PENNSYLVANIA

SIGNAL

Application filed April 26, 1929. Serial No. 358,262.

The present invention relates to an automobile direction signal and has for its prime object to provide a signal arm mounted on one side of an automobile with means interiorly of the automobile for controlling the position of the arm to give different signals.

Another very important object of the invention resides in the provision of a signal arm with means for rockably mounting the same and means interiorly of the automobile for controlling said rocking arm, the last mentioned means having associated therewith means for holding the arm at different positions.

A still further very important object of the invention resides in the provision of a signal of this nature which is exceedingly simple in construction, inexpensive to manufacture, strong and durable, thoroughly efficient and reliable in operation, easy to manipulate and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional view through the forward right hand portion of an automobile showing my improved signal apparatus mounted in place, Figure 2 is a sectional view taken substantially on the line 2—2 of Figure 1, Figure 3 is a sectional view taken substantially on the line 3—3 of Figure 2, Figure 4 is a detail section through the shaft showing the drum thereon for the cable, Figure 5 is an elevation of the keeper sleeve, Figure 6 is a similar view taken at right angles to that shown in Figure 5, Figure 7 is a detail sectional view substantially on the line 7—7 of Figure 5, Figure 8 is a perspective view of the operating knob and shank, and Figure 9 is a detail elevation of another form of the signalling arm.

Referring to the drawing in detail it will be seen that the numeral 5 denotes an elongated tube which is curved at one end and said one end terminates in an outwardly directed annular flange 6 to be placed against a washer 7 abutting wind shield 8 and the wind shield is provided with an opening 9 registering with the opening in the washer or gasket 7 and the interior of said one end of the tube 5.

Gasket 5 is against the outside of the windshield. A similar gasket 10 is against the inside of the windshield and has held thereon an annular flange 11 of a keeper sleeve 12. Bolts 14 hold the flange 6, gasket 7, gasket 10 and flange 11 assembled to the windshield.

A tubular casing 15 extends over the keeper sleeve 12. A hollow shank 16 extends into the keeper sleeve 12 to be rocked therein and moved longitudinally thereof. A knob 17 is formed on the outer end of the shank. The keeper sleeve is provided with a plurality of longitudinally extending slots 18 of varying length the outer ends of which terminate in offsets 19.

The shank 16 is provided with a lug 20 for movement in the slots 18. A cable 21 is anchored to the knob 17 and extends through the shank 16 and through the tube 5.

On the other end of the tube there is a split neck 23 of a casing 24 provided with a slot 25. A shaft 26 is journaled across the casing and has mounted thereon a signalling arm 28 in the form of an arrow for which may be substituted a signalling arm 28' in the form of a hand.

A drum 29 is fixed to the shaft and has a notch 30 in which the end of the cable 21 is anchored as at 31 for winding on the drum. Another smaller drum 32 is mounted on the shaft and has anchored thereto the inner end of a coil spring 33 the outer end of which is anchored to the casing as at 34.

This coil spring normally holds the signalling arm 28 inclining downwardly and inwardly toward the automobile and in abutment with a bumper 35 depending from the split neck 23. When in this position the cable is partially wound about the drum 29.

It will therefore be seen that when the knob 17 is closed the signalling arm may be swung to either of the three positions indicated by lines 37, 38 and 39 depending upon the slot 18 into which the lug 20 has been started. Obviously the lug 20 may be seated in one of the offsets 19 to hold the signalling arm in the desired position.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In an actuator for signals, a sleeve provided at one end with a flange for securing the sleeve to a support, a casing mounted concentrically of the sleeve, a shank slidably and rockably mounted in the sleeve, said shank adapted to be operatively connected with the signal for actuating the latter, said sleeve provided with a series of longitudinally extending circumferentially spaced slots respectively provided at the inner ends thereof with an offset portion, said shank being provided with a lug adapted to be selectively engaged with a slot for reception in the offset end of the slot to retain the shank against casual movement.

In testimony whereof I affix my signature.

HARRY J. STECKROTH.